US006859907B1

(12) United States Patent
McGarry

(10) Patent No.: US 6,859,907 B1
(45) Date of Patent: Feb. 22, 2005

(54) LARGE DATA SET STORAGE AND DISPLAY FOR ELECTRONIC SPREADSHEETS APPLIED TO MACHINE VISION

(75) Inventor: John McGarry, Portland, OR (US)

(73) Assignee: Cognex Technology and Investment Corporation, Mt. View, CA (US)

( * ) Notice: Subject to any disclaimer, the term of this patent is extended or adjusted under 35 U.S.C. 154(b) by 0 days.

(21) Appl. No.: 09/370,706

(22) Filed: Aug. 9, 1999

(51) Int. Cl.⁷ ................................................ G06F 5/00
(52) U.S. Cl. ..................... 715/503; 715/509; 345/440
(58) Field of Search ................................ 707/503, 505, 707/103; 709/315; 345/440; 715/503, 509; 719/315

(56) References Cited

U.S. PATENT DOCUMENTS

| | | | |
|---|---|---|---|
| 4,992,781 A * | 2/1991 | Iwasaki et al. ............. 345/640 |
| 5,021,973 A | 6/1991 | Hernandez et al. |
| 5,121,499 A | 6/1992 | McCaskill et al. |
| 5,226,118 A | 7/1993 | Baker et al. |
| 5,252,951 A | 10/1993 | Tannenbaum |
| 5,317,686 A * | 5/1994 | Salas et al. ................. 345/835 |
| 5,410,649 A | 4/1995 | Gove |
| 5,416,895 A * | 5/1995 | Anderson et al. ........... 715/503 |
| 5,455,903 A | 10/1995 | Jolissaint et al. |
| 5,481,620 A | 1/1996 | Vaidyanathan |
| 5,546,525 A | 8/1996 | Wolf et al. |
| 5,574,930 A | 11/1996 | Halverson, Jr. et al. |
| 5,633,998 A | 5/1997 | Schlafly |
| 5,721,847 A | 2/1998 | Johnson |
| 5,768,158 A | 6/1998 | Adler et al. |
| 5,774,878 A | 6/1998 | Marshall |
| 5,815,152 A | 9/1998 | Collier et al. |
| 5,883,623 A | 3/1999 | Cseri |
| 5,893,128 A | 4/1999 | Nauckhoff |
| 5,910,895 A | 6/1999 | Proskauer et al. |
| 5,915,257 A | 6/1999 | Gartung et al. |
| 5,926,822 A | 7/1999 | Garman |
| 5,933,638 A | 8/1999 | Cencik |
| 5,933,830 A * | 8/1999 | Williams .................... 707/100 |
| 5,961,831 A | 10/1999 | Lee et al. |
| 6,032,157 A | 2/2000 | Tamano et al. |
| 6,061,689 A * | 5/2000 | Chang et al. ........... 707/106 R |
| 6,078,747 A | 6/2000 | Jewitt |
| 6,138,130 A * | 10/2000 | Adler et al. ................. 715/503 |
| 6,195,092 B1 * | 2/2001 | Dhond et al. ............... 345/763 |
| 6,199,078 B1 | 3/2001 | Brittan et al. |
| 6,222,531 B1 * | 4/2001 | Smith ......................... 345/803 |
| 6,298,474 B1 | 10/2001 | Blowers et al. |
| 6,317,128 B1 | 11/2001 | Harrison et al. |
| 6,360,188 B1 | 3/2002 | Freidman et al. |
| 6,366,284 B1 | 4/2002 | McDonald |
| 6,442,538 B1 | 8/2002 | Nojima |
| 6,490,600 B1 | 12/2002 | McGarry |
| 6,631,497 B1 | 10/2003 | Jamshidi et al. |

OTHER PUBLICATIONS

Piersol, Kurt W. "Object Oriented Spreadsheets: The Analytic Spreadsheet Package," OOPSLA '86 Proceedings, p. 385–390: Sep., 1986.*

(List continued on next page.)

Primary Examiner—Stephen S. Hong
Assistant Examiner—Adam Queler
(74) Attorney, Agent, or Firm—Russ Weinzimmer

(57) ABSTRACT

An electronic spreadsheet is improved for machine vision applications by incorporating single method objects, and a data display buffer position beneath a variably transparent spreadsheet grid. The data display buffer works in cooperation with the single method objects to selectively display stored data sets in superimposed relationship with the variably transparent spreadsheet grid. The resulting user-interface is particularly advantageous for machine vision applications, and other applications using large data sets.

17 Claims, 4 Drawing Sheets

OTHER PUBLICATIONS

Levoy, Marc "Spreadsheets for Images," Computer Graphics Proceedings, Annual Conference Series p. 139–146: 1994.*

Mastering Excel 97 Fourth Edition, Thomas Chester and Richard H. Alden, Sybex 1997, pp. 351–354.*

Hallberg et al., "Using Microsoft Excel 97", copyright 1997, pp. 682–684.

Bruce Hallberg, Using Microsoft Excel 97, Special Edition Using Microsoft Excel 97, Bestseller Edition, Chapter 6, pp. 189–211.

Chester, Thomas, et al. Mastering Excel 97, 1997, sybex, $4^{th}$ Edition, pp. 56, 57, 107, 139.

Gary A. Mintchell, Vision Systems Revealed, Nov. 1998 control Engineering Back to Basics: Control Engineering Online.

Amitabh Varshney & Arie Kaufman, Finesse, A Financial Information Spreadsheet, Department of Computer Science, State University of New York at Stony Brook, Stony Brook, NY 11794–4400, IEEE 1996.

Banerjea, Dave K., Smart Choices in Calibration Management Software, Apr. 1998, download from url:http://www.qualitydigest.com/april98//html/calsoft, pp. 1–8.

Titus, Jon, Machine–Vision Software: It's Not Just for Experts, Test & Measurement World, downloaded from url:<http:/www.tmworld.com/articles/04_15_1999_machine_vision.html>, Apr. 15, 1999, pp. 1–7.

* cited by examiner

LARGE DATA SET STORAGE AND DISPLAY FOR ELECTRONIC SPREADSHEETS APPLIED TO MACHINE VISION

FIELD OF THE INVENTION

The invention relates to user interfaces for computer programs, and more particularly to user interfaces in the field of machine vision.

BACKGROUND OF THE INVENTION

In the field of factory automation, the high cost of implementing machine vision technology represents a significant barrier to the wide-spread adoption of industrial image sensors. Traditionally, a large part of this cost has been attributed to the expense of software development. Programmers with specialized machine vision experience are often required to accomplish ostensibly simple machine vision tasks. Although many attempts have been made to simplify application development, there has been no clear solution to the machine vision ease-of-use problem.

The superior ease-of-use characteristics of electronic spreadsheets are well known, especially in such fields as office automation. The use of electronic spreadsheets in the field of machine vision is also known, although in the past, the spreadsheet metaphor could not be adequately exploited for such applications. One reason for this is that machine vision programming tasks typically involve the manipulation of images and other large data sets, a task poorly suited to conventional electronic spreadsheets.

A standard spreadsheet consists of a rectangular grid of cells, each cell representing a single value that is, in turn, a function of some number of other cells in the grid. The standard electronic spreadsheet is suited for implementing formulas that require a relatively small number of input values and generate a single scalar output. In contrast, certain machine vision functions are parameterized by arguments representing a million or more pixel values. Since there is no facility in a standard electronic spreadsheet that enables a single cell to represent multiple values, the standard spreadsheet model is clearly not suited to support functions that operate on images and other large data sets.

In the fields of scientific visualization and computer graphics, the term "spreadsheet" has been loosely applied to certain programs that manage multiple images and other data representations in a two-dimensional rectangular grid within a bounding window. These programs, typically designed for graphical editing and array processing, essentially, allow individual data cells to be formatted as data arrays. However, in order to accommodate data sets of varying size, these interfaces generally abandon the strict two-dimensional grid relationship between cells that is the essence of the spreadsheet paradigm. In fact, most of these programs are unrecognizable as spreadsheets, and are generally unsuited for machine vision.

SUMMARY OF THE INVENTION

The invention provides methods for adapting electronic spreadsheets to applications in the field of industrial machine vision. The invention also substantially preserves the fundamental characteristics of conventional electronic spreadsheets. The invention also makes efficient use of a given display area and resolution, using for example, a semitransparent spreadsheet superimposed over an image of the contents of a data buffer. Further, the invention facilitates and simplifies the manipulation of images and other large data sets, while preserving the ease-of-use, and other advantages and benefits, of the spreadsheet paradigm.

The invention exploits a new class of object-oriented spreadsheet functions that incorporate internal data buffering. In addition, the invention provides methods by which the graphical representation of buffered data sets may be displayed simultaneously with a spreadsheet grid, preferably as a graphics layer positioned beneath a variably transparent spreadsheet grid. A split-screen and dual screen approach can also be employed for displaying the buffered data sets alongside the electronic spreadsheet.

In a preferred embodiment, a conventional spreadsheet is extended to include data buffering functions, herein referred to as "single method objects", because from the perspective of the spreadsheet programmer, there is only one public member function, i.e., only one public method. For example, in accordance with the invention, the familiar "search" tool of machine vision is the public member function of the search object, which includes a search function, as well as data associated with the search function.

A single method object can be instantiated and assigned to a spreadsheet cell within a variably transparent grid superimposed on a graphical display buffer, the contents of the graphical display buffer being determined in accordance with the currently selected cell. If an empty cell, or a cell containing a conventional spreadsheet formula is selected, the image last acquired is stored and displayed in the underlying graphical display buffer. If a cell containing a single method object is selected, a graphical representation of the object data members is stored in the underlying buffer and displayed.

The foregoing methods selectively extend data dimensionality to meet the practical requirements of machine vision processing, while still retaining the fundamental characteristics and ease-of-use of a conventional electronic spreadsheet.

BRIEF DESCRIPTION OF DRAWING

The invention will be more fully understood from the following detailed description, in conjunction with the following figures, wherein.

DETAILED DESCRIPTION

Figure 1:
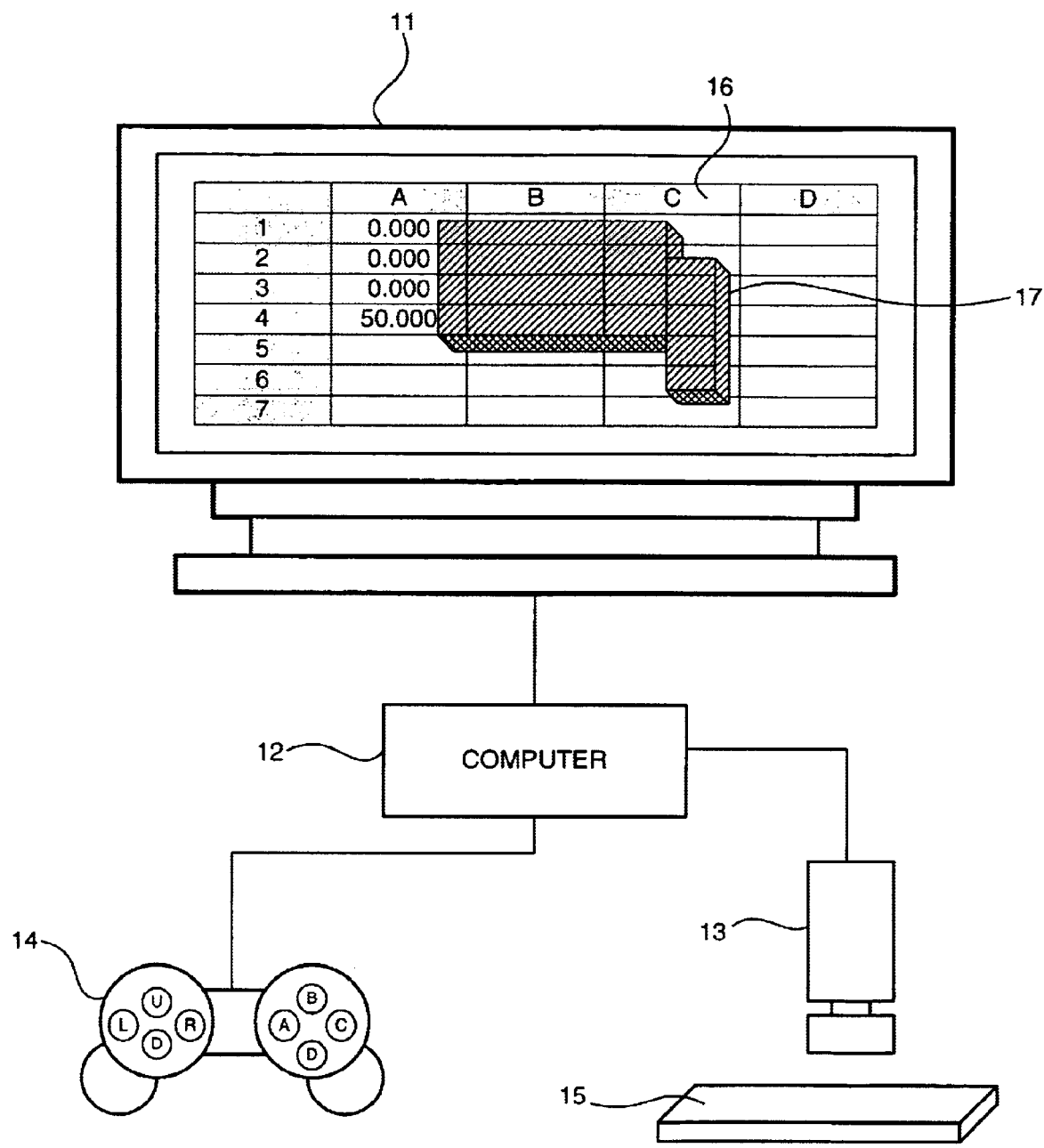
FIG. 1 is a block diagram of a computer system for suitable for practicing the invention.

Referring to FIG. 1, a preferred spreadsheet user interface for machine vision applications includes a monitor 11 connected by cable to a computer 12. The computer 12 includes image acquisition, processing, and graphical display capability. A camera and lens assembly 13 has an object surface 15 within its field of view, and is connected to the computer 12. Also, connected to the computer 12 is a user input device, such as a game controller 14, or a standard keyboard (not shown).

The screen of the monitor 11 depicts a semitransparent spreadsheet 16 superimposed on an image and graphics layer 17 to form a composite display of the invention. The transparency of the semitransparent spreadsheet 16 can be adjusted by the user. The semitransparent spreadsheet 16 can also be displayed in a split-screen arrangement wherein the image and graphics layer 17 is displayed on one portion of the screen of the monitor 11, and the semitransparent spreadsheet 16, which may be adjusted so as to no longer be transparent, can be displayed in another portion of the screen of the monitor 11. Alternatively, the image and graphics layer 17 can be displayed on the screen of the monitor 11, and the semitransparent spreadsheet 16, which may be adjusted so as to no longer be transparent, can be displayed on the screen of a second monitor (not shown).

Figure 2:
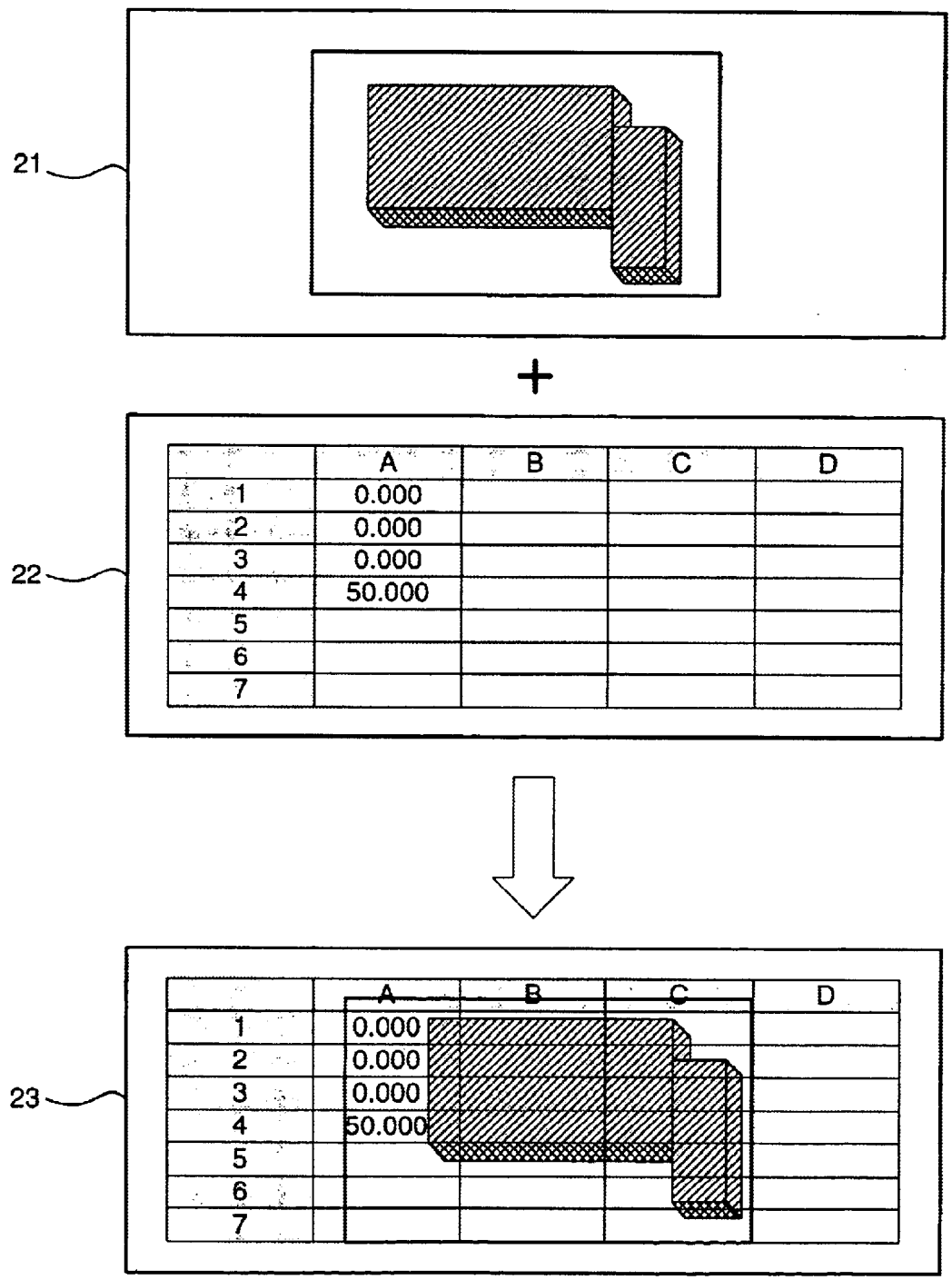
FIG. 2 illustrates a superposition of graphics layers to obtain the user-interface graphics display of the monitor of FIG. 1.

FIG. 2 shows the superposition combination of the contents of data display buffer 21 and the semitransparent spreadsheet overlay 22 to form a composite display 23. Not shown are the split-screen combination, and the dual-screen combination of the contents of data display buffer 21 and the semitransparent spreadsheet overlay 22.

FIGS. 3, 4, 5, and 6 illustrate the effect of spreadsheet cell selection on the underlying data display buffer. The contents of the underlying data display buffer changes in accordance with the particular cell that is currently selected. Also, the contents of the formula line changes in accordance with the particular cell that is currently selected. Note that only the data contents of the selected cell is displayed; all of the other data associated with the objects underlying the other cells remains invisible to the user. By contrast, all of the data in a standard spreadsheet is visible to a user, including a large standard spreadsheet, notwithstanding the need to scroll over the large spreadsheet.

Figure 3:
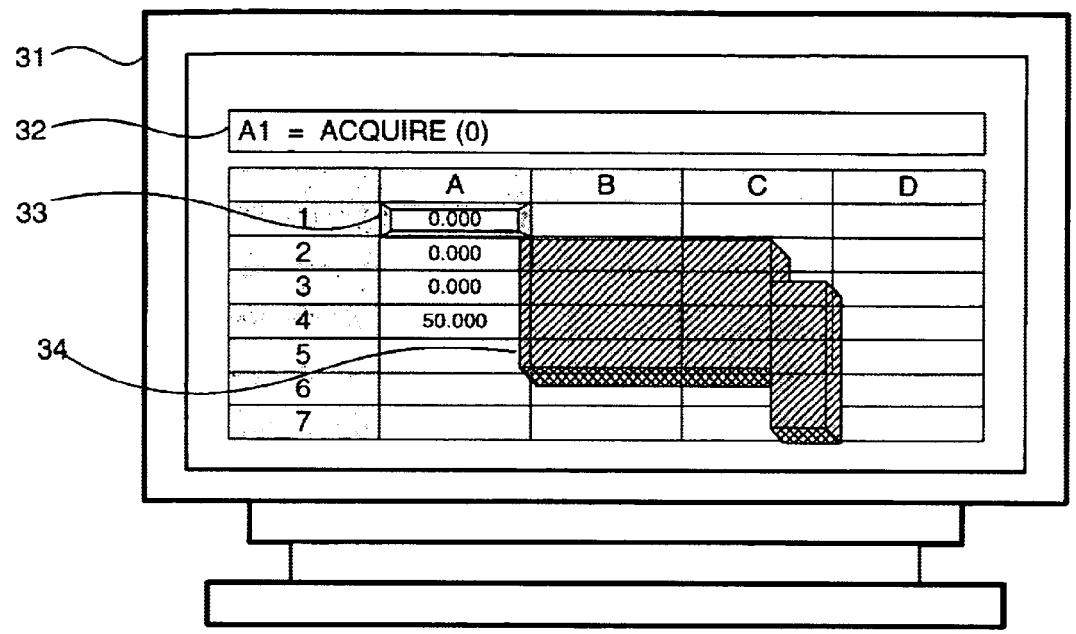
FIG. 3 is a depiction of the graphical user interface of the invention with cell A1 selected of a semi-transparent spread sheet that is superimposed on the image corresponding to the single method object instantiated in cell A1.

In monitor 31 of FIG. 3, spreadsheet focus (highlight) 33, indicated by the frame border (or any selection highlighting), is on cell A1. Formula line 32 indicates that cell A1 is assigned the single method object ACQUIRE, which contains an image buffer resulting from its image acquisition method. The underlying data display buffer 34 shows the content of the image buffer associated with ACQUIRE.

Figure 4:
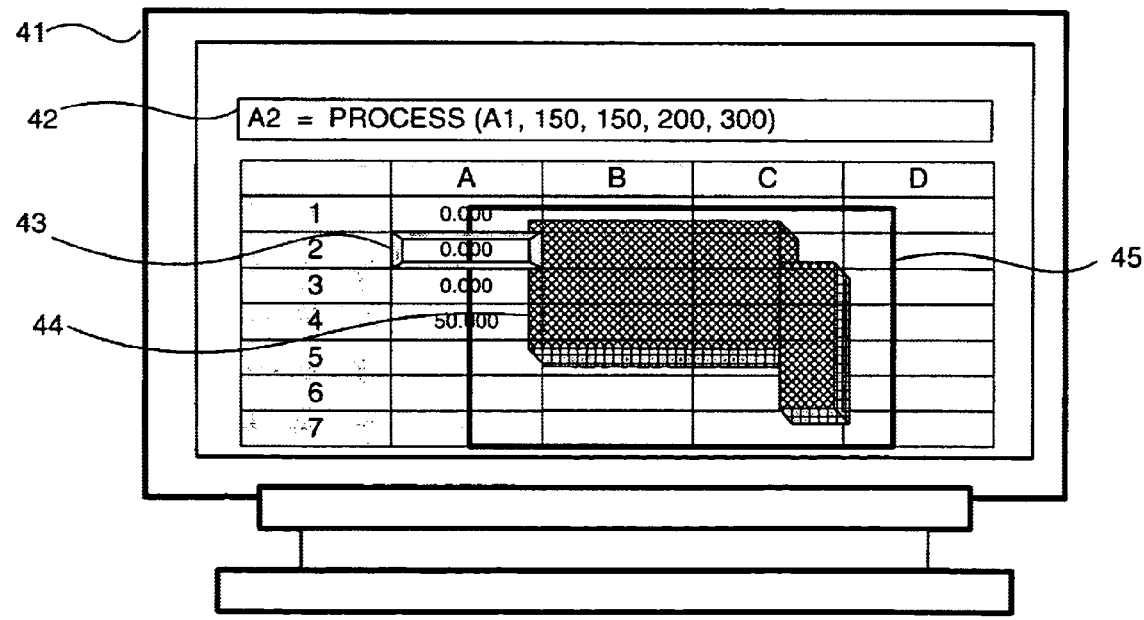
FIG. 4 is a depiction of the graphical user interface of the invention with cell A2 selected of a semi-transparent spread sheet that is superimposed on the image corresponding to the single method object instantiated in cell A2.

In monitor 41 of FIG. 4, spreadsheet focus 43 is on cell A2. Formula line 42 indicates that cell A2 is assigned the single method object PROCESS which contains the image buffer that results from the processing a rectangular region 45 in the image associated with cell A1. The other four arguments of the object PROCESS represent the coordinates of the upper-left corner, and the height and width, of the rectangular region 45 in the image associated with cell A1. The underlying data display buffer 44 shows the content of the image buffer associated with the processed image.

Figure 5:
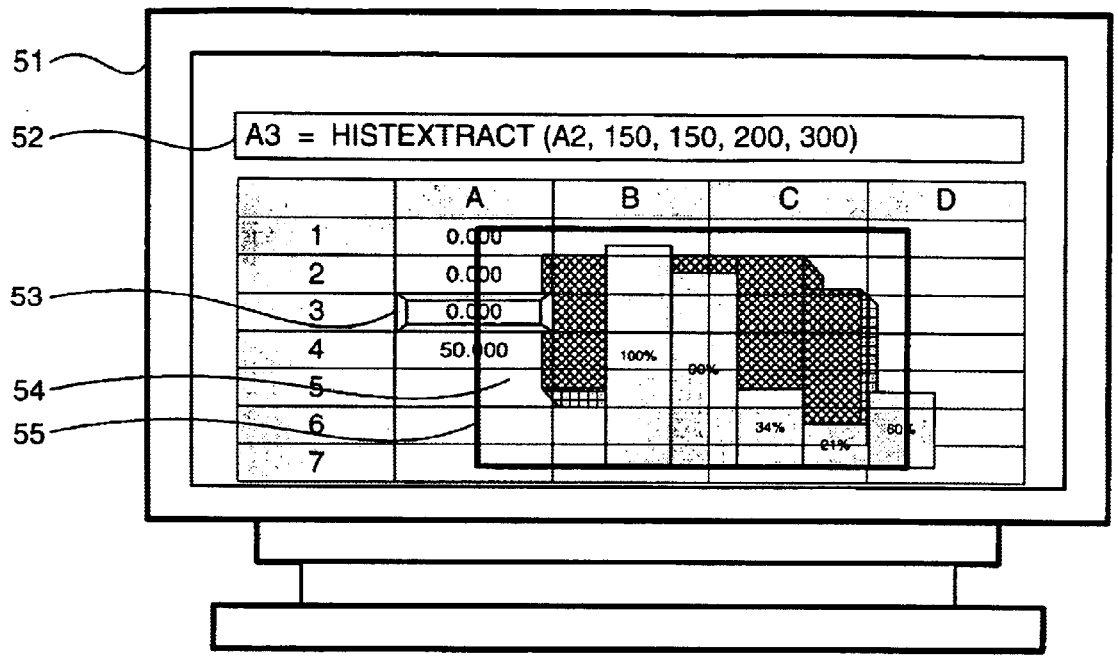
FIG. 5 is a depiction of the graphical user interface of the invention with cell A3 selected of a semi-transparent spread sheet that is superimposed on the image corresponding to the single method object instantiated in cell A3.

In monitor 51 of FIG. 5, spreadsheet focus 53 is on cell A3. Formula line 52 indicates that cell A3 in this example is assigned the single method object HISTEXTRACT which contains a histogram array extracted from a rectangular region 55 in the processed image assigned to cell A2. The other four arguments of the object PROCESS represent the coordinates of the upper-left corner, and the height and width, of the rectangular region 55 in the image associated with cell A2. The underlying data display 54 shows the content of the input image buffer plus a graphical representation of the histogram array associated with the content of the input image buffer.

Figure 6:
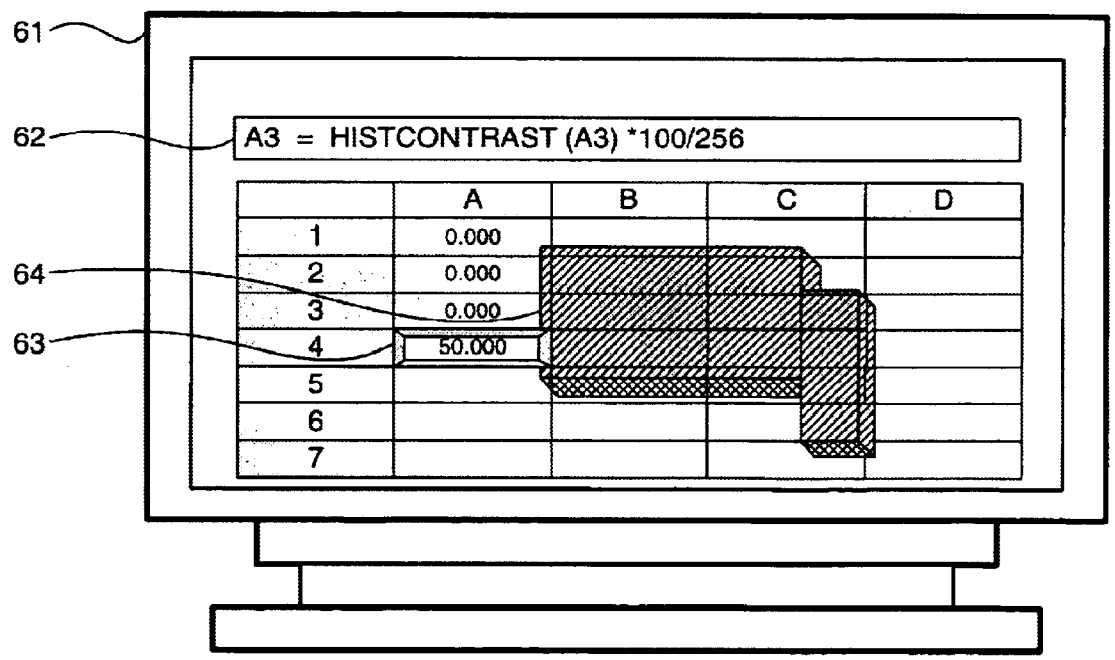
FIG. 6 is a depiction of the graphical user interface of the invention with cell A4 selected of a semi-transparent spread sheet that is superimposed on the image corresponding to the image last acquired.

In monitor 61 of FIG. 6, spreadsheet focus 63 is on cell A4. Formula line 62 indicates that cell A4 in this example is assigned a contrast value computed from the histogram array assigned to cell A3. The underlying data display buffer 64 shows the content of the acquired image.

The forgoing illustrates how single method objects co-operate with a variably transparent spreadsheet overlaid on the contents of a data display buffer so as to efficiently and elegantly extend the conventional spreadsheet paradigm to accommodate images and other large data sets.

Other modifications and implementations will occur to those skilled in the art without departing from the spirit and the scope of the invention as claimed. Accordingly, the above description is not intended to limit the invention except as indicated in the following claims.

What is claimed is:

1. An electronic spreadsheet having a plurality of cells, the improvement comprising:

a single method object, adapted to be instantiated in at least one of the spreadsheet cells, and adapted to provide internal data storage and a single member function, the single member function being adapted to access internal data stored in the single method object and return a single value, the internal data stored in the single method object not being displayed until a spreadsheet cell in which the object is instantiated is selected by a user;

a single data display buffer, the data contents of which are displayed under a partially transparent spreadsheet grid; and means for selectively displaying the internal data of the single method object in the single data display buffer by selecting a spreadsheet cell in which the single method object is instantiated, the internal data of only one single method object being displayed at one time under the partially transparent spreadsheet grid.

2. The electronic spreadsheet of claim 1, wherein the partially transparent spreadsheet grid is characterized by a partial transparency that is independent of cursor position.

3. The electronic spreadsheet of claim 1, wherein the partially transparent spreadsheet grid is always visible.

4. The method of claim 1, wherein the partially transparent spreadsheet grid is visible in its entirety, regardless of which cell is selected.

5. A method for selectively displaying large data sets in an electronic spreadsheet having a plurality of cells, the method comprising:

instantiating a single method object in each of a plurality of the cells of the spreadsheet, each single method object being adapted to provide internal storage for storing a large data set, and a single member function adapted to access the large data set and return a single value, the large data set stored in the single method object not being displayed until a spreadsheet cell in which the object is instantiated is selected by a user;

displaying the large data set of the single method object corresponding to a selected cell of the spreadsheet in which the single method object is instantiated, the large data set of only one single method object being displayed at one time; and displaying in superimposed relationship with the large data set a partially transparent spreadsheet grid including the selected cell.

6. The method of claim 5, wherein the partially transparent spreadsheet grid is characterized by a partial transparency that is independent of cursor position.

7. The method of claim 5, wherein the partially transparent spreadsheet grid is always visible.

8. The method of claim 5, wherein the partially transparent spreadsheet grid is visible in its entirety, regardless of which cell is selected.

9. A user-interface method for selectively displaying machine vision images stored in an electronic spreadsheet having a plurality of cells, the method comprising:

instantiating a single method object in each of a plurality of the cells of the spreadsheet, each single method object being adapted to provide internal storage for storing a machine vision image, and a single member function adapted to access the single method object and return a single value the machine vision image stored in the single method object not being displayed until a spreadsheet cell in which the object is instantiated is selected by a user;

selecting a cell from the plurality of cells;

displaying the machine vision image stored in the single method object corresponding to the selected cell, the machine vision image of only one single method object being displayed at one time; and displaying in superimposed relationship with the machine vision image a partially transparent electronic spreadsheet grid including the selected cell.

10. The user-interface method of claim 9, wherein the partially transparent electronic spreadsheet is adjustably transparent, and is adapted so as to allow a continuous range of adjustments to transparency.

11. The user-interface method of claim 9, wherein the selected cell is selected using a game controller.

12. The user-interface method of claim 9, wherein the selected cell is selected using one of a standard keyboard and a mouse.

13. The user-interface method of claim 9, wherein the machine vision image includes a superposition of an object image, and a graphical representation of an analysis of the object image.

14. The user-interface method of claim 13, wherein the analysis of the object image is a histogram of the object image.

15. The method of claim 9, wherein the partially transparent spreadsheet grid is characterized by a partial transparency that is independent of cursor position.

16. The method of claim 9, wherein the partially transparent spreadsheet grid is always visible.

17. The method of claim 9, wherein the partially transparent spreadsheet grid is visible in its entirety, regardless of which cell is selected.

* * * * *